US010063738B2

(12) United States Patent
Fernandes et al.

(10) Patent No.: US 10,063,738 B2
(45) Date of Patent: Aug. 28, 2018

(54) DIGITAL CONTENT ACCESS USING A MACHINE-READABLE LINK

(71) Applicant: Hewlett-Packard Development Company, L.P., Houston, TX (US)

(72) Inventors: Lenin Fernandes, Bangalore (IN); Kumaravel Ganesan, Dindigul (IN); Prashant Asthana, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/304,138

(22) PCT Filed: Apr. 10, 2015

(86) PCT No.: PCT/US2015/025321
§ 371 (c)(1),
(2) Date: Oct. 14, 2016

(87) PCT Pub. No.: WO2015/164097
PCT Pub. Date: Oct. 29, 2015

(65) Prior Publication Data
US 2017/0041494 A1 Feb. 9, 2017

(30) Foreign Application Priority Data
Apr. 22, 2014 (IN) .......................... 2061/CHE/2014

(51) Int. Cl.
*H04N 1/32* (2006.01)
*G06F 3/12* (2006.01)
(Continued)

(52) U.S. Cl.
CPC ....... *H04N 1/32304* (2013.01); *G06F 3/1206* (2013.01); *G06F 3/1232* (2013.01);
(Continued)

(58) Field of Classification Search
None
See application file for complete search history.

(56) References Cited

U.S. PATENT DOCUMENTS 7,657,750 B2   2/2010  Haas
8,107,129 B2   1/2012  Yang et al.
(Continued)

FOREIGN PATENT DOCUMENTS

JP    2010232771    10/2010
KR     100373105     2/2003
(Continued)

*Primary Examiner* — Thomas D Lee
(74) *Attorney, Agent, or Firm* — HP Inc. Patent Department

(57) ABSTRACT

Examples disclosed herein relate to providing access to digital content using a machine-readable link. As an example, an annotation comprising digital content, for a portion of a digital content, is identified in response to a print request. Based on the annotations, a machine-readable link associated with the digital content is generated. Subsequently, a printable format version of the digital document comprising the machine-readable link, and excluding the annotation is obtained wherein the machine-readable link is readable by a computing device to obtain access to the digital content over a communication network.

13 Claims, 7 Drawing Sheets

(51) Int. Cl.
*G06F 17/30* (2006.01)
*H04N 1/00* (2006.01)
*G06F 17/22* (2006.01)
*G06F 17/24* (2006.01)

(52) U.S. Cl.
CPC .......... *G06F 3/1242* (2013.01); *G06F 3/1265* (2013.01); *G06F 3/1267* (2013.01); *G06F 3/1285* (2013.01); *G06F 3/1287* (2013.01); *G06F 17/2235* (2013.01); *G06F 17/241* (2013.01); *G06F 17/30879* (2013.01); *H04N 1/00116* (2013.01)

(56) References Cited

U.S. PATENT DOCUMENTS

| | | |
|---|---|---|
| 8,320,611 B2 | 11/2012 | Alattar et al. |
| 8,570,586 B2 | 10/2013 | Calhoon et al. |
| 8,610,935 B1 * | 12/2013 | McKinley ............. G06F 3/1204 358/1.15 |
| 2002/0080995 A1 | 6/2002 | Rhoads |
| 2005/0216851 A1 | 9/2005 | Hull et al. |
| 2007/0177824 A1 * | 8/2007 | Cattrone ........... G06F 17/30011 382/306 |

FOREIGN PATENT DOCUMENTS

| | | |
|---|---|---|
| KR | 20130074853 | 7/2015 |
| WO | WO-0171960 | 9/2001 |
| WO | WO-2013134854 A1 | 9/2013 |

* cited by examiner

DIGITAL CONTENT ACCESS USING A MACHINE-READABLE LINK

BACKGROUND

To a large extent, information available over the Internet is in the form of digital documents. While accessing and using such digital documents, a user may annotate one or more portions of the digital document with text based comments using a computing device. The annotations provided onto the digital document may also include digital content.

BRIEF DESCRIPTION OF THE DRAWING

The following detailed description references the drawings, wherein.

DETAILED DESCRIPTION

Figure 1A:
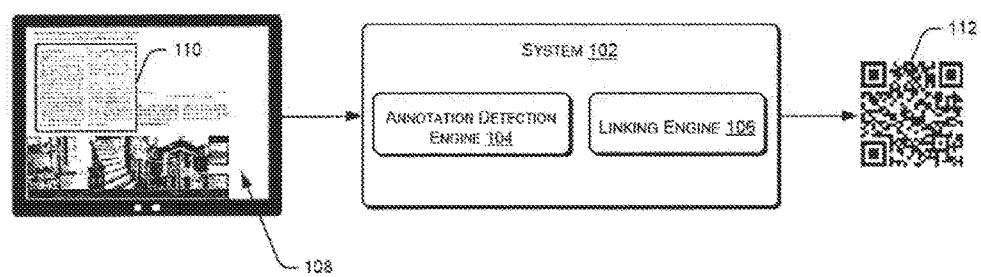
FIG. 1A is a network environment implementing an example system to access digital content using a machine-readable link.

Digital documents are accessible through user computing devices by users, who access and use such documents for a variety of purposes. Through such computing devices, users are in a position to create new digital documents, or in some cases where the digital documents are already present, provide self-authored comments to the existing digital documents in the form of annotations. Annotating a digital document may involve providing some relevant digital content within either a portion, or the entire digital document. As a result, the annotations may provide information in addition to preexisting content of the digital documents. Thus, annotations may be considered to supplement the information of the digital documents. When such a digital document is printed, both the preexisting content of the digital document and the annotations may be printed onto a print medium.

In some cases, the annotation may include digital content, such as textual content, audio or video content, or other content such as a web-based link through which a computing device may connect with an external repository to access the digital content. However, if such a digital document is printed, the digital content provided with the annotations may not be accessible. For example, on printing, a print device may simply print the digital document with the URL of the web-based link. In such cases, the digital content associated with the annotations may be inaccessible when printed.

Approaches for providing access to digital content using a machine-readable link are described. For example, a request to print a digital document is received. On receiving the print request, the digital document may be analyzed to determine the presence of one or more annotations. The annotations may be associated with the entire document, or with one or more portions of the digital document. On identifying the annotations, a machine-readable link is generated based on the annotations. The machine-readable link is linked with the digital content, such that the digital content is accessible over a communication network, using the machine-readable link. In one example, the annotations may be associated with metadata. The metadata may be further encoded into the machine-readable link.

In conformance with the print request, a printable format version of the digital document is subsequently generated. The printable format version, besides including preexisting content of the digital document (i.e., content other than the annotation), also includes the machine-readable link but excludes the annotation. Therefore, the digital document when printed onto a physical print medium, such as paper, would include the machine-readable link along with the preexisting content of the digital document, but not the annotation. In examples described herein, "preexisting" content of a digital document may be the content included in the digital document when provided from an author, publisher, creator, or other producer (i.e., person(s) or entit(ies)) of the digital document to a recipient other than the producer, and excluding any annotations that may be added to the digital document by a recipient.

The printed document may be further utilized for accessing associated digital content. In examples described herein, a "printed document" may be a version of the digital document printed on a physical print medium, which may include a machine-readable link, as described herein. In examples described herein, the machine-readable link may be captured by a computing device, which is remote from the device providing the annotations. For example, the computing device may comprise an image capturing device, such as a digital camera, which may capture an image of the machine-readable link. Based on the machine-readable link, the computing device may communicate with a repository for accessing stored digital content which is associated with the machine-readable link. The digital content may subsequently be displayed onto the computing device. In such a manner, even though the digital content and annotation are not printed or available on the printed document, a computing device may still be able to access the associated digital content, such as comments posted by a user, an audio clip, a video, or a link for accessing the aforementioned types of media.

As would be understood, a machine-readable link may include any printed indicators which are optically readable by a computing device. Examples of such machine-readable links include, but are not limited to, one- or two-dimensional barcodes, digital watermarks, optically readable images, QUICK RESPONSE (QR) codes, and the like. The machine-readable link provided onto the printed document may or may not be visible or discernible to a naked eye.

In another example, a linking engine associates (i.e., links) the machine-readable link with the digital content. As also mentioned, the machine-readable link may be generated based on the annotations and the digital content, either individually or combination with each other. The linking engine so links the machine-readable link with the digital content, such the digital content is accessible upon interacting with the machine-readable link using a computing device. To this end, the linking engine may determine a link identifier. The linking engine may map the link identifier with the digital content provided within the annotations.

Subsequently, the linking engine provides access to the digital content, whenever the machine-readable link is interacted with using, for example, an image capturing device.

In another example, the link identifier may also be utilized for providing user specific access to digital content using the same machine-readable link. In such a case, user specific identifiers may be determined. The linking engine may further associate the user specific identifiers with the link identifier. Corresponding to the each combination of the user specific identifiers and link identifier, different digital content may be further mapped. Therefore, when interacting with the machine-readable link provided onto a printed document, the mapping between the user specific identifiers, the link identifier and the digital content may be processed, and access to the digital content based on the mapping is provided.

In this manner, examples described herein may enable accessing digital content using a machine-readable link provided on a printed document, using one or more computing device(s). The proposed approaches may be utilized in different fields which involve disseminating information in an interactive and an engaging manner. For example, teachers may provide annotations by supplementing the content of digital documents, such as that of instructional materials, with further digital content. The instructional material with the annotations may be printed and distributed. Furthermore, the print layout of the printed document is retained even though annotations may have been provided with the corresponding digital document. Additionally, digital content such as a URLs which otherwise are not readily usable when printed, may still be accessed through the machine-readable link. As is gathered, despite the limitations of a printed document being able to communicate information only in a printed manner, examples described herein provide access to annotated digital content which otherwise may be rendered inaccessible by the printed document.

Examples are further described herein with reference to FIGS. 1A-1B, and FIGS. 2-6. It should be noted that the description and figures relate to example implementations, and should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

FIG. 1A provides a block diagram for an example system 102 for providing access to digital content using a machine-readable link. In the present example, the system 102 includes an annotation detection engine 104 and a linking engine 106. In operation, the system 102 receives a digital document 108 having annotations 110. The annotations 110 are provided in addition to the preexisting content included within the digital document 108. Based on the annotations 110, the system generates a machine-readable link 112. The machine-readable link 112 is generated, and is such that it provides information useable by a computing device to access digital content when the machine-readable link 112 is captured and processed by a computing device. In one example, the useable information may be encoded within the machine-readable link 112. The manner in which the system 102 provides access to digital content using a machine-readable link, such as the machine-readable link 112, is further described by way of examples, as provided in conjunction with FIG. 1B.

Figure 1B:
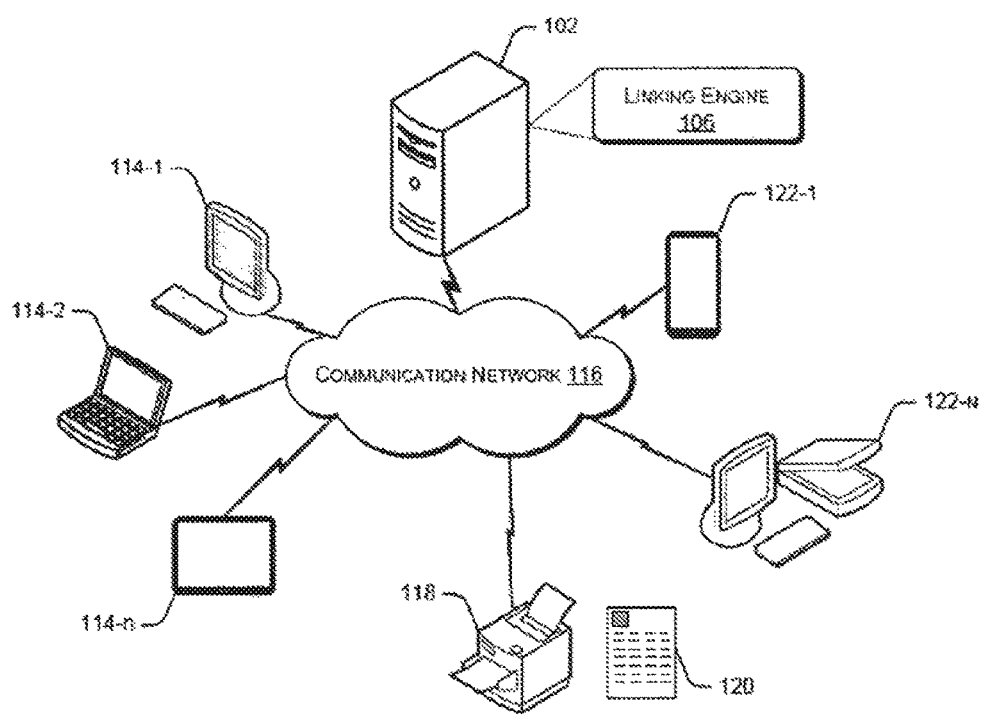
FIG. 1B is a block diagram of an example system to access digital content using a machine-readable link.

FIG. 1B schematically illustrates a network environment 100 implementing the example system 102 which provides access to digital content using a machine-readable link. The system 102 may be implemented as, but is not limited to, at least one server, workstation, computer, or the like. The system 102 may communicate with one or more different computing entities. For example, the system may communicate with one or more devices 114-1, 2, . . . , n over a communication network 116. The network 116 may include, for example, a local area network (LAN), a wireless local area network (WLAN), a virtual private network (VPN), the Internet, or the like, or a combination thereof. In some examples, a computer network may include a telephone network (e.g., a cellular telephone network).

The devices 114-1, 2, . . . , n allow users to access one or more digital documents. The digital documents, such as the digital document 108, may in turn be stored either locally, or may be accessible from a remote repository. While accessing the digital documents, the users may also utilize devices 114-1, 2, . . . , n for annotating one or more portions of the digital documents. While annotating, the users through devices 114-1, 2, . . . , n (hereinafter referred to as annotating devices 114) may select a portion of the digital document, say digital document 108, being viewed. Subsequently through the annotating devices 114, additional digital content accompanying the preexisting content, may be provided by a user. As illustrated in FIG. 1A, the system 102 further includes the annotation detection engine 104 and the linking engine 106.

In the present examples described herein, "digital content" associated with the annotations 110 may be any suitable type of information that may be accessed (e.g., retrieved, viewed, etc.) over a computer network, such as the network 116. Example of digital content may include, but are not limited to digital video, audio, a website or webpage, a uniform resource identifier (URI) (such as a uniform resource locator (URL)) for web content (e.g., a website), or the like.

Returning to the example of FIGS. 1A and 1B, the annotating devices 114 may annotate the digital document 108 being viewed. Once annotated, the digital content may be understood as being associated or linked with the digital document 108. Upon annotation by the annotating devices 114, the system 102 may store information indicating the mapping between the portion of the digital document and the corresponding digital content.

It may be the case that the users of the annotating devices 114 intend to distribute the digital document 108 as a printed document. In such a case, the annotating devices 114 may generate a print request. The print request for printing the digital document 108 is received by the system 102. In response to the print request, the annotation detection engine 104 may analyze the digital document 108 to determine whether it includes any annotations. In case the digital document 108 includes annotations, e.g., annotations 110, the linking engine 106 generates a machine-readable link 112 based on the annotations 110. The machine-readable link 112 thus generated is such, that it provides information useable by one or more computing devices to gain access to the digital content provided within the annotations 110. In an example, the linking engine 106 further links the machine-readable link 112 with the digital content of the annotations 110.

Once the machine-readable link 112 is obtained, the system 102 generates a printable format version which includes the machine-readable link 112 but excludes the annotations 110. In such examples, the link engine 106 removes the annotations 110 and inserts the machine-readable link 112, which is different than annotations 110. As a result, the printed document version of the digital document is printed with the preexisting content of the digital document and the machine-readable link 112, but without the annotations 110.

Based on the printable format version, a print device 118 coupled to the network 116 prints the preexisting content of the digital document 108 onto a print medium along with the machine-readable link 112, but excluding the annotations 110, to provide a printed document 120. The printed document 120 may then be distributed for circulation and for further information dissemination. As should be noted, the printed document 120, which in turn is based on the printable format version, neither has the annotations 110, nor does it display the digital content which was provided with the digital document 108 by way of the annotations 110. Furthermore, the machine-readable link 112 is different in content from both the annotations 110 and the digital content of the annotations 110. For example, the machine-readable link 112 may be a barcode, whereas the digital content may include a video content audio content, a URL represented as text (e.g., a string of English-language characters, symbols, and punctuation), etc.

In order to access the digital content, one or more computing devices 122-1, 2, . . . , n, remote from the annotating devices 114, may capture an image of the machine-readable link 112 provided onto the printed document 120. The computing devices 122 may be any computing device coupled to an image capturing system. Such an image capturing system may be either integrated with the computing device, such as hand-held communication devices, or may be peripheral devices such as scanners, communicatively coupled to a computing device.

Any one of the computing devices 122 may capture an image of the machine-readable link 112 and communicate the same to the system 102. The system 102 analyzes the captured image and determines the machine-readable link 112, to which the captured image corresponds to. In another example, any of the computing devices 122, such as computing device 122-1, may derive information based on the captured image of the machine-readable link 112. As noted above briefly, such information may be encoded into the machine-readable link 112. An example of such information includes a unique identifier of the machine-readable link 112. Such information when derived, may be subsequently communicated to the system 102. Accordingly, based on such derived information the system 102 may determine the machine-readable link 112.

Once the machine-readable link 112 is determined, the corresponding digital content is obtained. In an example, the digital content may be determined based on a mapping between the machine-readable link 112 and the annotations 110. On determining the required digital content, the same is communicated to one of the computing devices 122 over the network 116. For the purposes of the present description, the annotating devices 114 and the computing devices 122 are illustrated as in communication with the system 102 over the communication network 116. However, the devices 114, 122 may be in communication with the system 102 over different and remote communication networks.

Figure 2:
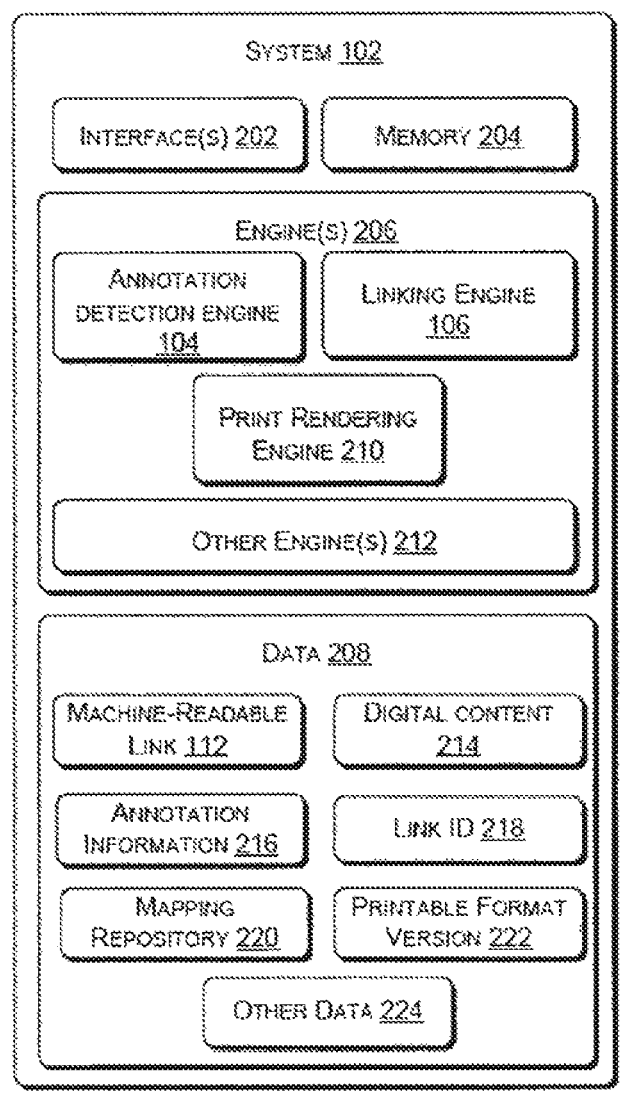
FIG. 2 is a block diagram of another example system to access digital content using a machine-readable link.

FIG. 2 illustrates an example system 102 for providing a remote computing device (such as any one of the devices 122) access to digital content using a machine-readable link. The system 102 may be implemented as described above, for example. The system 102 includes interface(s) 202 and memory 204. The interface(s) 202 may include a variety of interfaces, for example, interfaces for data input and output devices, referred to as I/O devices, storage devices, network devices, and the like. The interface(s) 202 facilitate communication between the system 102 and various computing devices connected in the network environment 100, including, but not limited to, annotating devices 114 and computing devices 122.

The memory 204 may store one or more computer-readable instructions, which may be fetched and executed so as to cause to provide access to digital content using a machine-readable link. The memory 204 may include any non-transitory computer-readable medium including, for example, volatile memory such as RAM, or non-volatile memory such as EPROM, flash memory, and the like.

The system 102 may further include engine(s) 206 and data 208. The engine(s) 206 may be implemented as a combination of hardware and programming (e.g., programmable instructions) to implement one or more functionalities of the engine(s) 206. In examples described herein, such combinations of hardware and programming may be implemented in a number of different ways. For example, the programming for the engine(s) 206 may be processor executable instructions stored on a non-transitory machine-readable storage medium and the hardware for the engine(s) 206 may include a processing resource (e.g., one or more processors), to execute such instructions. In the present examples, the machine-readable storage medium may store instructions that, when executed by the processing resource, implement engine(s) 206. In such examples, the system 102 may include the machine-readable storage medium storing the instructions and the processing resource to execute the instructions, or the machine-readable storage medium may be separate but accessible to system 102 and the processing resource In other examples, engine(s) 206 may be implemented by electronic circuitry.

The data 208 includes data that is either predefined or generated as a result of the functionalities implemented by any of the engine(s) 206. In an example, the engine(s) 206 include the annotation detection engine 104, the linking engine 106, a print rendering engine 210 and other engine(s) 212. The other engine(s) 212 may implement functionalities that supplement applications or functions performed by the system 102. Further, the data 208 may include machine-readable link 112, digital content 214, annotation information 216, link identifiers 218, mapping repository 220, and other data 224. The other data 224 may include data generated and saved by the engine(s) 206 for implementing various functionalities of the system 102.

In operation, the system may receive a request to print a digital document 108 onto which one or more annotations, such as annotations 110, have been provided. As noted previously, the annotations 110 to the digital document 108 may be provided by any one (or more) of the annotating devices 114, such as annotating device 114-1, for example. The annotations 110 may further include digital content. The digital content may be any suitable type of information that may be accessed over a communication network, such as the network 116. The digital content may also include additional content supplementing the preexisting content of the digital document 108.

The annotations 110 may appear as in-line comments alongside the portion of the digital document 108 which has been annotated. In another example, the annotations 110 may be indicated by the selected portion being displayed as highlighted in a pre-selected color. In such a case, the digital content of the annotations 110 may be hidden and may be displayable based on user input received through the annotating device 114-1.

Returning to the system 102, the print request generated by annotating device 114-1 is received. The print request may be further accompanied with the digital document 108 which includes the annotations 110. In the present example, the portion of the digital document 108 to be printed may be communicated to the system 102. The portion of the digital document 108 to be printed may be identified based on the print request. In an example implementation, the digital content within the annotations 110 is stored as digital content 214.

On receiving the digital document 108 and the annotations 110, the annotating devices 114 may determine corresponding information associated with the annotations 110. Such information is stored as annotation information 216. The annotation information 216 may include metadata associated with the annotations 110. For example, the annotations 110 may be represented in an XML (i.e., extensible Markup Language) format. Based on the XML format of the annotations 110, the annotating devices 114 may determine the metadata associated with digital content of the annotations 110. Examples of such metadata include identification of the author, type or format of the digital content, and the like.

On determining the annotation information 216 associated with the digital content of the annotations 110, the linking engine 106 generates a machine-readable link, such as the machine-readable link 112. In an example, information is encoded in the machine-readable link 112 based on the annotation information 216. In another example, the annotation information 216 may be encoded into the machine-readable link 112. For example, in a case where the digital content 214 specifies a URL or a web-link, the machine-readable link 112 may be generated such that it encodes the URL or web-link in machine-readable link 112. In such examples, the machine-readable link 112 may be encoded with the URL or web-link in a manner that is different than the manner in which the URL or web-link is included in the annotation(s) 110. For example, the machine-readable link 112 may encode the URL or web-link in a barcode or digital watermark while the URL or web-link is included in the annotations 110 as text (e.g., a string of English-language characters, symbols, and punctuation). The machine-readable link 112 may be stored within the system 102 as an image file, or any format based on which the same can be displayed. The linking engine 106 may determine and assign a unique link identifier to the generated machine-readable link 112. In such a case, each of the unique link identifiers may be stored as link ID 218. As used herein, a "unique" link identifier is an identifier that is exclusively used in relation to one machine-readable link 112 in at least system 102.

The linking engine 106 may further associate (i.e., link) the relevant digital content 214 with the machine-readable link 112 such that the digital content 214 is accessible using the machine-readable link 112 (e.g., accessible in response to capturing machine-readable link 112 with an imaging device, such as computing device 122-1). The linking engine 106 may also maintain a mapping between the digital content 214 and the corresponding machine-readable link 112. The mapping identifies the digital content 214 to be accessed based on the machine-readable link 112. In an example implementation, the mapping may include a mapping between the digital content 214 and the link ID 218 of the machine-readable link 112. The mapping is stored in mapping repository 220.

The system 102, after generating the machine-readable link 112, further processes the print request for printing the digital document 108 through the print rendering engine 210. The print rendering engine 210 obtains the digital document 108 and the machine-readable link 112. The print rendering engine 210 processes the digital document 108 and the machine-readable link 112, to render a printable format version 222 of the digital document 108 including the machine-readable link 112. The printable format version 222 may be a file format in which digital document 108 with the included machine-readable link 112, may be printed using a print device 118 (e.g., printer). The file format may specify rendering information depicting one or more of page descriptors, layout information, font information, graphical information, text-based information, and any other similar information for completely displaying or printing, the desired content. In another example implementation, the printable format version 222 may further include instructions which, when executed, generate file format information for printing or displaying the desired content In one example, the file format of the printable format version 222 is a portable document format (PDF).

Returning to the system 102, the printable format version 222 includes, for displaying or printing, the preexisting content of the digital document 108 along with the machine-readable link 112, but excludes the annotations 110. The system 102 may further communicate the printable format version 222 to the print device 118 which is in communication with the annotating device 114-1, either directly or through a communication network (e.g., the network 116). The print device 118 may print the printable format version 222 to generate a printed document 120 including the preexisting content of the digital document 108 and the machine-readable link 112, but not the annotations 110.

In some examples, the printable format version 222 may further include exclusively portions of document 108 which have been annotated. In such examples, instead of the entire digital document 108 or at least the entire page of the digital document 108, only such portion(s) that had been annotated, would be displayed or printed. In such examples, a plurality of annotated portions from digital document 108 may be printed on a single page.

The machine-readable link 112 may be positioned proximally to the portion of the digital document 108, onto which the annotations 110 were provided. On the other hand, the machine-readable link 112 may be provided at any predefined position on the printed document 120. One or more copies of the printed document 120 may be further generated by the print device 118, and subsequently distributed.

For accessing the digital content using a machine-readable link, printed document 120 may be presented to a remote computing device, such as a computing device 122-1. The computing device 122-1 further is coupled with an image capturing apparatus (not shown in the FIGS. 1A and 1B). The image capturing apparatus may include a web-camera or any other digital camera which may be subsequently coupled with the computing device 122-1. The image capturing apparatus may be further integrated within the computing device 122-1. For example, the computing device 122-1 may be a mobile phone provided with an in-built camera.

Upon presenting the printed document 120, the image capturing apparatus may capture an image of the machine-readable link 112 included on the printed document 120.

Once the image is captured, the computing device 122-1 may generate an indication that an image of the machine-readable link 112 has been obtained. The indication is subsequently communicated to the system 102. In one example, the indication may include information encoded within the machine-readable link 112. The encoded information may be determined by the computing device 122-1.

The indication along with the encoded information is received by the system 102. Based on the indication and/or the encoded information, the system 102 identifies the machine-readable link 112. For example, the linking engine 106 identifies the machine-readable link 112 by comparing the encoded information with the link ID 218. In the present example, the comparison may be based on a mapping between the encoded information and link ID 218 stored on or accessible to system 102. In such examples, based on the comparison or mapping, the linking engine 106 may identify the appropriate link ID 218 for the machine-readable link 112 which was captured remotely by the computing device 122-1.

Once the link ID 218 is identified, the linking engine 106 may identify the digital content 214 based on the mapping stored in the mapping repository mapping repository 220. Through the mapping repository mapping repository 220, the related digital content 214 may identified. Based in the identified digital content 214, linking engine 106 may provide computing device 122-1 access to the digital content 214. For example, the linking engine 106 may establish a communication link to transmit the digital content 214 to the computing device 122-1. In another example implementation, the linking engine 106 may further provide an access link to the computing device 122-1 based on which computing device 122-1 may access the digital content 214.

Figure 3:
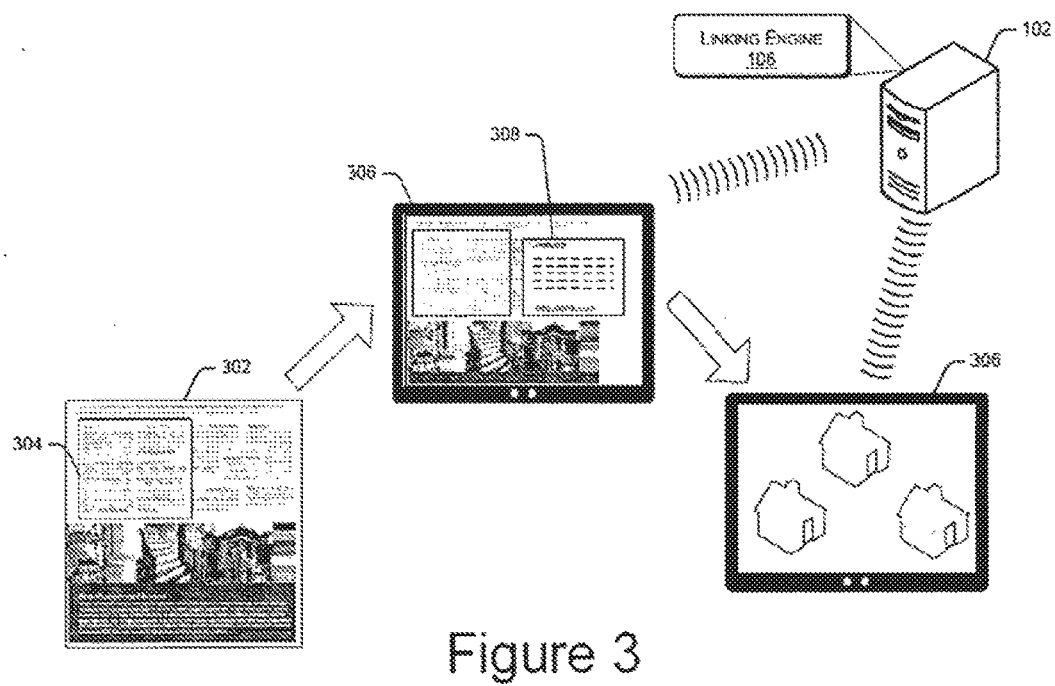
FIG. 3 is an example illustration depicting example computing devices to access digital content using a machine-readable link.

FIG. 3 is an example illustration 300 depicting an example computing device to access digital content using a machine-readable link. In the present example illustration, a printed document 302 with a machine-readable link 304 is obtained. In the illustration 300, the machine-readable link 304 is depicted as a shaded portion which may have optically readable indicators positioned at specific locations within the highlighted portion. The printed document 302 is presented to a computing device, such as device 306. When presented, the device 306 captures an image of the machine-readable link 304. As depicted in the example illustration 300, the image captured is also displayed on the display screen of the device 308. Based on the captured image of the machine-readable link 304, encoded information within the link 304 is obtained and communicated to system 102.

Within the system 102, the linking engine 106 determines a link ID 218 corresponding to the machine-readable link 304, the image of which was captured by the device 306. Based on the mapping repository 220, the linking engine 106 determines the digital content 214 which is subsequently communicated to the device 306. The digital content 214 linked with the machine-readable link 304 is presented onto the display of the device 306. In one example, the digital content 214 is presented onto a portion 308 of the display. In this manner, by using the machine-readable link 112 the digital content 214 is accessible and viewable to a user of the computing device 122-1. The portion 308 may display one or more types of digital content 214 such as a textual description, a URL, audio content or video content. Subsequently, the user of the computing device 122-1 may further interact with the information provided in the portion 308 to gain access to the digital content 214, as illustrated.

Figure 4:
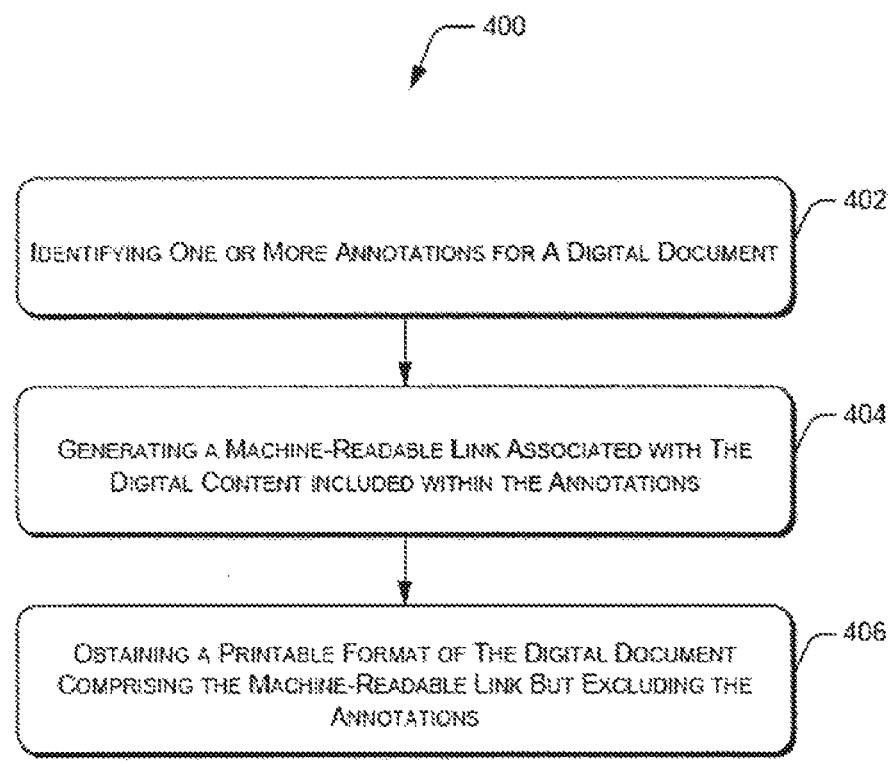
FIG. 4 is a flowchart of an example method for accessing digital content using a machine-readable fink.
Figure 5:
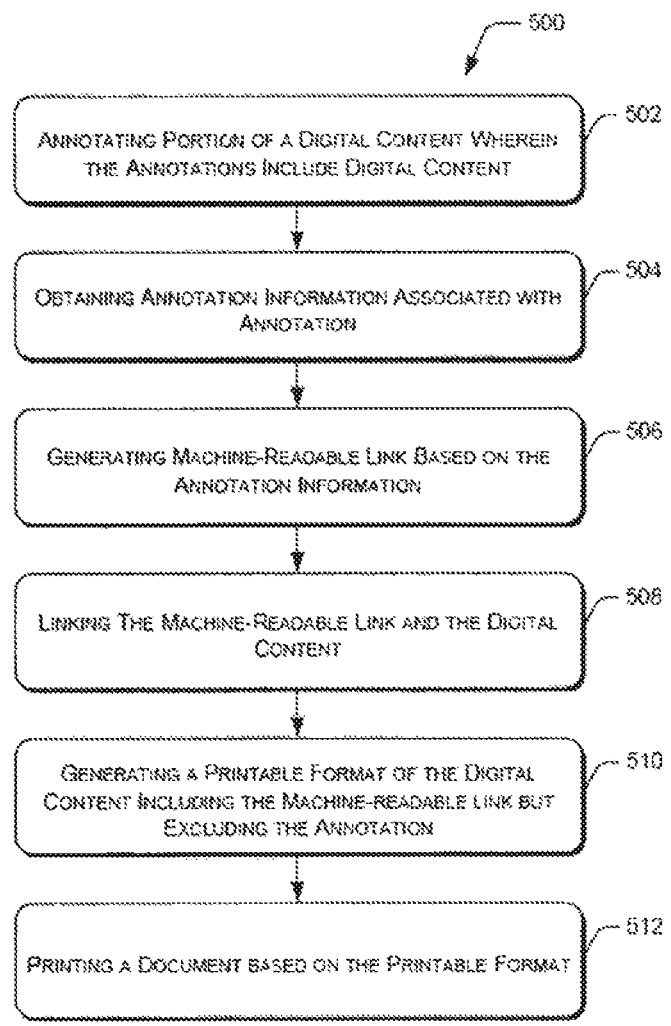
FIG. 5 is a flowchart of another example method for accessing digital content using a machine-readable link.

FIGS. 4 and 5 illustrate example methods 400 and 500, respectively, to provide access to digital content using a machine-readable link, according to an implementation of the present subject matter. The order in which the methods are described is not intended to be construed as a limitation, and any number of the described method blocks may be combined in any order to implement the aforementioned methods, or an alternative method. Furthermore, methods 400 and 500 may be implemented by processing resource or computing device(s) through any suitable hardware, non-transitory machine readable instructions, or combination thereof.

It may also be understood that methods 400 and 500 may be performed by programmed computing devices, such as system 102 as depicted in FIGS. 1A and 2. Furthermore, the methods 400 and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, the methods 400 and 500 are described below with reference to system 102 as described above, other suitable systems for the execution of these methods can be utilized. Additionally, implementation of these methods is not limited to such examples.

Referring to FIG. 4, at block 402, in response to a print request for printing a digital document, one or more annotations of the digital document are identified. For example, the print request may be generated by any of the annotating devices 114. As also described previously, using any of the annotating devices 114 (e.g., annotating device 114-1), one or more annotations 110 may be provided to the digital document 108. In an example, the annotations 110 are identified by the annotation detection engine 104. While providing the annotations 110, a plurality of digital content may be provided with the digital document 108.

At block 404, a machine-readable link for the digital content included within the annotations, is generated. For example, the linking engine 106 on determining the annotations 110 and the digital content provided therein, may generate a machine-readable link 112 based on the annotations 110.

At block 406, a printable format version of the digital document comprising the machine-readable link but excluding the annotations, is generated. Based on the printable format version, one or more printed documents may be generated. For example, the print rendering engine 210 generates (e.g., renders) a printable format version 222 based on the digital document 108 and the machine-readable link 112. The rendered printable format version 222 includes the digital document 108 and the machine-readable link 112, but excluding the annotations 110.

FIG. 5 provides another example method 500 for providing access to digital content using a machine-readable link. At block 502, one or more portions of a digital document are annotated. For example, one or more annotations 110 may be provided for one or more portions of a digital document 108. The annotations 110 may further include annotation content. In one example, the annotation content may be digital content such as audio, video, or text-based content.

At block 504, annotation information associated with the annotations is obtained. For example, the annotation detection engine 104, on determining the annotations 110 and the digital content provided therein, may further obtain annotation information 216 associated with the annotations 110. The annotation information 216, amongst other things, may include metadata. Examples of such metadata include identification of the author, type or format of the digital content, and the like.

At block 506, a machine-readable link is generated based on the annotation information. For example, the linking engine 106 obtains the annotation information 216. Based on the annotation information 216, the linking engine 106 generates a machine-readable link 112. The annotation information 216 may further include metadata associated with the annotations 110. In one example implementation, the linking engine 106 generates the machine-readable link 112 by encoding the metadata into the machine-readable link 112, to obtain an encoded machine-readable link 112.

At block 508, machine-readable link is linked with the digital content provided within the annotations. For example, the linking engine 106 links the machine-readable link 112 with the digital content 214. For inking, the linking engine 106 may generate a mapping repository 220. The mapping repository 220 may include a table mapping the digital content 214 with the relevant machine-readable link 112. In one example, the mapping repository 220 may further include a mapping of the digital content 214 with the link ID 218. As would be understood, linking causes the digital content 214 to be accessible using the machine-readable link 112 using, for example, a remote computing device, such as computing device 122-1 or device 306.

At block 510, a printable format version of digital document, which includes the preexisting content of the digital document and the machine-readable link, is generated. For example, the printable format version 222 may be a version of the digital document 108, with the included machine-readable link 112, in a file format in which the desired digital document 108 can be printed at a print device. The file format may specify one or more rendering conditions which in turn would determine the manner in which the digital document 108 is to be rendered, for either displaying or printing. In one example, the printable format version 222 may be based on XML Paper Specification (XPS). For obtaining the printable format version 222, the print rendering engine 210 may remove the annotations 110 from the digital document 108, and may subsequently insert the machine-readable link 112 into the digital document 108.

At block 512, a document based on the printable format version may be printed. For example, based on a print request received from the annotating device 114-1, a print device, such as print device 118, may be identified. Once identified, the printable format version 222 may be communicated to the print device 118, either directly or through the annotating device 114-1, for printing. The print device 118 may print printable format version 222 one or more times to produce one or more printed documents 120.

Figure 6:
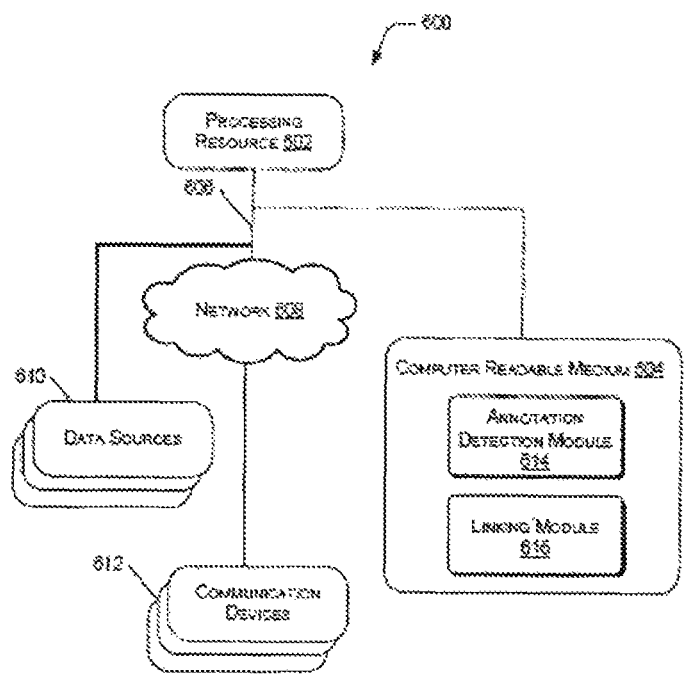
FIG. 6 is a block diagram of an example system implementing a non-transitory computer-readable medium, to access digital content using a machine-readable link.

FIG. 6 illustrates a system environment 600 to provide access to digital content using a machine-readable link, according to an example of the present disclosure. The system environment 600 may comprise at least a portion of a public networking environment or a private networking environment, or a combination thereof. In one implementation, the system environment 600 includes a processing resource 602 communicatively coupled to a computer readable medium 604 through a communication link 606.

For example, the processing resource 602 can include one or more processors of a computing device for providing access to digital content using a machine-readable link. The computer readable medium 604 can be, for example, an internal memory device of the computing device or an external memory device. In one implementation, the communication link 606 may be a direct communication link, such as any memory read/write interface. In another implementation, the communication link 606 may be an indirect communication link, such as a network interface. In such a case, the processing resource 602 can access the computer readable medium 604 through a network 608. The network 608 may be a single network or a combination of multiple networks and may use a variety of different communication protocols.

The processing resource 602 and the computer readable medium 604 may also be coupled to data sources 610 through the communication link 606, and/or to communication devices 612 over the network 608. The coupling with the data sources 610 enables in receiving the data in an offline environment, and the coupling with the communication devices 612 enables in receiving the data in an online environment.

In one implementation, the computer readable medium 604 includes a set of computer readable instructions, implementing an annotation detection module 614 and a linking module 616. The set of computer readable instructions can be accessed by the processing resource 602 through the communication link 606 and subsequently executed to process data communicated with the data sources 610 in order to provide access to digital content based on a machine-readable link. When executed by processing resource 602, the instructions of annotation detection module 614 may perform the functionalities described above in relation to annotation detection engine 104. When executed by processing resource 602, the instructions of linking module 616 may perform the functionalities described above in relation to linking engine 106.

For example. In response to a print request for printing a digital document, the annotation detection module 614 may identify one or more annotations 110 for a digital document 108. The annotations 110 may be annotation provided by any of the annotating devices 114 (e.g., annotating device 114-1) in addition to the preexisting digital content of the digital document 108. As part of the annotations 110, the user of the annotating device 114-1 may provide digital content with the annotations 110. In such examples, the annotated digital document 108 may be communicated to the system 102 as part of the print request. In response to the print request, the annotation detection module 614 may identify the annotations 110 provided with the digital document 108.

Once the annotations 110 are identified, the annotation detection module 614 may further determine annotation information 216. Using the annotation information 216, the linking module 616 may subsequently generate a machine-readable link 112. The machine-readable link 112 is linked with the digital content included within the annotations. 110, such that the digital content may be accessed over the network 608 using the machine-readable link 112. In one example, the machine-readable link 112 is encoded with metadata obtained from the annotation information 216.

The computer-readable medium 604 may further include a print rendering module including instructions that, when executed by processing resource 602, execute the functionalities described above in relation to print rendering engine 210. In such examples, the instructions of the print rendering module may generate (e.g., render) a printable format version 222 of the digital document 108 including the machine-readable link 112. Based on the printable format version 222, which includes the preexisting content of the digital document 108 and the machine-readable link 112, one or more printed documents, such as printed document 120, may be further generated. In one example, the instructions of the print rendering module may generate executable print instructions which cause a print device (not shown in FIG. 6) coupled to the network 608 to generate one or more printed documents 120 (i.e., printed versions of printable format version 222). The generated printed document(s) 120 are such that they each include the preexisting content of the digital document 108 and the machine-readable link 112, but exclude the annotations 110. As a result, the annotations 110 are not visible on the printed document(s) 120.

Although examples for the present disclosure have been described in language specific to structural features and/or methods, it should stood that the appended claims are not necessarily limited to the specific features or methods described. Rather, the specific features and methods are disclosed and explained as examples of the present disclosure.

We claim:

1. A method comprising:
   identifying an annotation for a portion of a digital document, in response to a print request for printing the digital document, wherein the annotation includes digital content;
   generating a machine-readable link for the digital content included within the annotation;
   obtaining a printable format version of the digital document comprising the machine-readable link, and excluding the annotation, wherein the machine-readable link is readable by a computing device to obtain access to the digital content using a communication network; and
   determine a link identifier associated with the machine-readable link; and
   map the determined link identifier with the digital content to obtain a digital content mapping, wherein the machine-readable link is to allow access based at least on the digital content mapping.

2. The method as claimed in claim 1, further comprising communicating the printable format version to a printing device for printing, wherein the printing device is determined in response to receiving the print request.

3. The method as claimed in claim 1, wherein the digital content includes one of a video content, audio content and a textual data.

4. The method as claimed in claim 1, wherein the generating the machine-readable link further comprises:
   obtaining metadata associated with the annotation; and
   encoding the metadata to generate the machine-readable link, wherein the machine-readable link includes the encoded metadata.

5. A system comprising:
   an annotation detection engine to:
      detect an annotated portion of a digital document in response to a request to print the digital document;
   a linking engine to:
      determine annotation content of the annotated portion of the digital document;
      generate a machine-readable link based on the annotation content;
      link the machine-readable link with the annotation content, wherein the machine-readable link is readable by a computing device to obtain access to the annotation content;
      remove the annotation content from the digital document; and
      insert the machine-readable link into the digital document; and
   a print rendering engine to:
      generate a printable format version of the digital document including preexisting content of the digital document and the machine-readable link, and excluding the annotation content; and
      provide the printable format version to a print device for printing, wherein the annotation detection engine is further to:
      receive, from a computing device, an indication that the machine-readable link on the printed format version has been obtained by the computing device; and
      provide the computing device access to the annotation content in response to the received indication.

6. The system as claimed in claim 5, wherein the annotation content includes a URL to an external repository, wherein the external repository is to store the annotation content.

7. The system as claimed in claim 5, wherein the print rendering engine is further to:
   generate the printable format version of the digital document based on the request to print, wherein the request is received via a communication network.

8. The system as claimed in claim 7, wherein the print rendering engine, in response to the request to print the digital document, is to render a portion of the preexisting content of the digital document, wherein the portion to be rendered is determined based on the print request.

9. The system as claimed in claim 5, wherein the linking engine further is to:
   determine a link identifier associated with the machine-readable link; and
   map the determined link identifier with the annotation content to obtain an annotation content mapping, wherein the machine-readable link is to allow access based at least on the annotation content mapping.

10. The system as claimed in claim 5, wherein the indication further includes metadata encoded within the machine-readable link.

11. The system as claimed in claim 5, wherein the digital document is an electronic book.

12. A non-transitory computer-readable medium comprising instructions executable by a processing resource to:
   upon receiving a print request for printing a digital document comprising at least one annotation with digital content, determine a link identifier associated with a machine-readable link and generate the machine-readable link to be associated to the at least one annotation, wherein the machine readable link comprises a link identifier associated with the digital content;
   assign the machine-readable link to the at least one annotation such that the machine-readable link is readable by a computing device to obtain access to the digital content of the at least one annotation, wherein the access is provided based at least on the link identifier; and
   cause a print device to generate a printed document including preexisting digital content of the digital document and the machine-readable link, and excluding the at least one annotation.

13. The computer-readable medium of claim 12, wherein the machine-readable link is one of a barcodes, a digital watermark, and an optically readable image.

* * * * *

UNITED STATES PATENT AND TRADEMARK OFFICE
CERTIFICATE OF CORRECTION

PATENT NO. : 10,063,738 B2
APPLICATION NO. : 15/304138
DATED : August 28, 2018
INVENTOR(S) : Lenin Fernandes et al.

It is certified that error appears in the above-identified patent and that said Letters Patent is hereby corrected as shown below:

In the Claims

In Column 14, Line 50, in Claim 12, delete "machine readable," and insert -- machine-readable, --, therefor.

Signed and Sealed this
Nineteenth Day of November, 2019

Andrei Iancu
*Director of the United States Patent and Trademark Office*